United States Patent
Mayer et al.

(10) Patent No.: US 9,475,573 B2
(45) Date of Patent: Oct. 25, 2016

(54) METHODS FOR MATCHING FLIGHT DATA

(71) Applicant: Austin Digital Inc., Austin, TX (US)

(72) Inventors: Thomas Joel Mayer, Austin, TX (US); Andras Pesti, Austin, TX (US); Howard Roice Nelson, III, Austin, TX (US)

(73) Assignee: AUSTIN DIGITAL INC., Austin, TX (US)

( * ) Notice: Subject to any disclaimer, the term of this patent is extended or adjusted under 35 U.S.C. 154(b) by 128 days.

(21) Appl. No.: 14/154,459

(22) Filed: Jan. 14, 2014

(65) Prior Publication Data

US 2015/0197330 A1 Jul. 16, 2015

(51) Int. Cl.
*B64C 19/00* (2006.01)
*G08G 5/00* (2006.01)
*G06Q 10/02* (2012.01)
*G06Q 10/08* (2012.01)
*G07C 5/00* (2006.01)

(52) U.S. Cl.
CPC .............. *B64C 19/00* (2013.01); *G06Q 10/02* (2013.01); *G06Q 10/08* (2013.01); *G07C 5/008* (2013.01); *G08G 5/00* (2013.01); *G08G 5/003* (2013.01); *G08G 5/0004* (2013.01); *G08G 5/0013* (2013.01); *G08G 5/0017* (2013.01); *G08G 5/0021* (2013.01); *G08G 5/0026* (2013.01); *G08G 5/0043* (2013.01)

(58) Field of Classification Search
CPC ................. G06F 17/17; G06F 17/175; G06F 17/30943; H04W 4/02; H04W 4/023; H04W 4/025; H04W 4/04; H04W 12/10; G08G 5/0013; G08G 5/0082; G08G 5/0026; G08G 5/0043; G08G 5/0021; G08G 5/0008; G08G 5/00; G08G 5/0004; G08G 5/0017; G08G 5/003; G06K 9/00536; G06Q 10/08
See application file for complete search history.

(56) References Cited

U.S. PATENT DOCUMENTS

| | | | |
|---|---|---|---|
| 6,259,977 B1 | 7/2001 | Mayer et al. | |
| 7,612,716 B2 * | 11/2009 | Smith | G01S 13/765 342/454 |
| 2005/0021221 A1 | 1/2005 | Cole et al. | |
| 2006/0085236 A1 | 4/2006 | Smith et al. | |
| 2008/0036659 A1 * | 2/2008 | Smith | G01S 13/765 342/454 |
| 2009/0094011 A1 | 4/2009 | Griffin et al. | |
| 2012/0143405 A1 | 6/2012 | Cabos | |
| 2013/0229298 A1 * | 9/2013 | Eckstein | G01S 13/726 342/107 |
| 2013/0265187 A1 * | 10/2013 | Hall | G01S 13/9303 342/37 |
| 2014/0067756 A1 * | 3/2014 | Stelman | G06Q 10/10 707/609 |
| 2014/0279864 A1 * | 9/2014 | Lopyrev et al. | 707/609 |

OTHER PUBLICATIONS

European Search Report and Opinion issued in connection with corresponding EP Application No. 15150921.3 on Jun. 2, 2015.
A Theory for Record Linkage, Ivan P. Fellegi and Alan B. Sunter, Journal of the American Statistical Association, vol. 64, No. 328 (Dec. 1969), pp. 1183-1210, Sep. 2, 2011.

* cited by examiner

*Primary Examiner* — Thomas G Black
*Assistant Examiner* — Sze-Hon Kong
(74) *Attorney, Agent, or Firm* — GE Global Patent Operation; William S. Munnerlyn

(57) ABSTRACT

A method of matching flight data from multiple sources, including receiving a parametric flight data set for a given flight where the parametric flight data set includes a number of data features, receiving operational flight data sets related to a number of flights where the operational flight data sets include a number of data features, and determining a matching operational flight data set for the parametric flight data set.

16 Claims, 5 Drawing Sheets

METHODS FOR MATCHING FLIGHT DATA

BACKGROUND OF THE INVENTION

A variety of aircraft data may be available from the aircraft both during and after a flight. Data relevant to the flight may also be available from a number of other aviation data sources. Determining the relevant flight data and correlating it with the aircraft data may prove difficult especially when incomplete and erroneous data exists.

BRIEF DESCRIPTION OF THE INVENTION

In one aspect, an embodiment of the invention relates to a method of matching flight data from multiple sources, including receiving a parametric flight data (PFD) set for a given flight where the PFD set includes a number of data features, receiving operational flight data (OFD) sets related to a number of flights where the OFD sets include a number of data features, comparing data features of the PFD set to data features of the OFD sets, determining matches between data features in the PFD set with data features in the OFD sets based on the comparison and determining a matching OFD set for the PFD set.

In another aspect, an embodiment of the invention relates to a method of matching flight data from multiple sources, including receiving at least one PFD set for a given flight where the at least one PFD set includes a number of data features, receiving OFD sets related to a number of flights where the OFD sets include a number of data features, comparing data features of the at least one PFD set to data features of the OFD sets, determining a total score for each OFD set, determining if the total score satisfies at least one predetermined threshold value, and determining a match between the at least one PFD set and one of the OFD sets when the total score satisfies the at least one predetermined threshold value and link data sets based thereon.

DESCRIPTION OF EMBODIMENTS OF THE INVENTION

Figure 1:
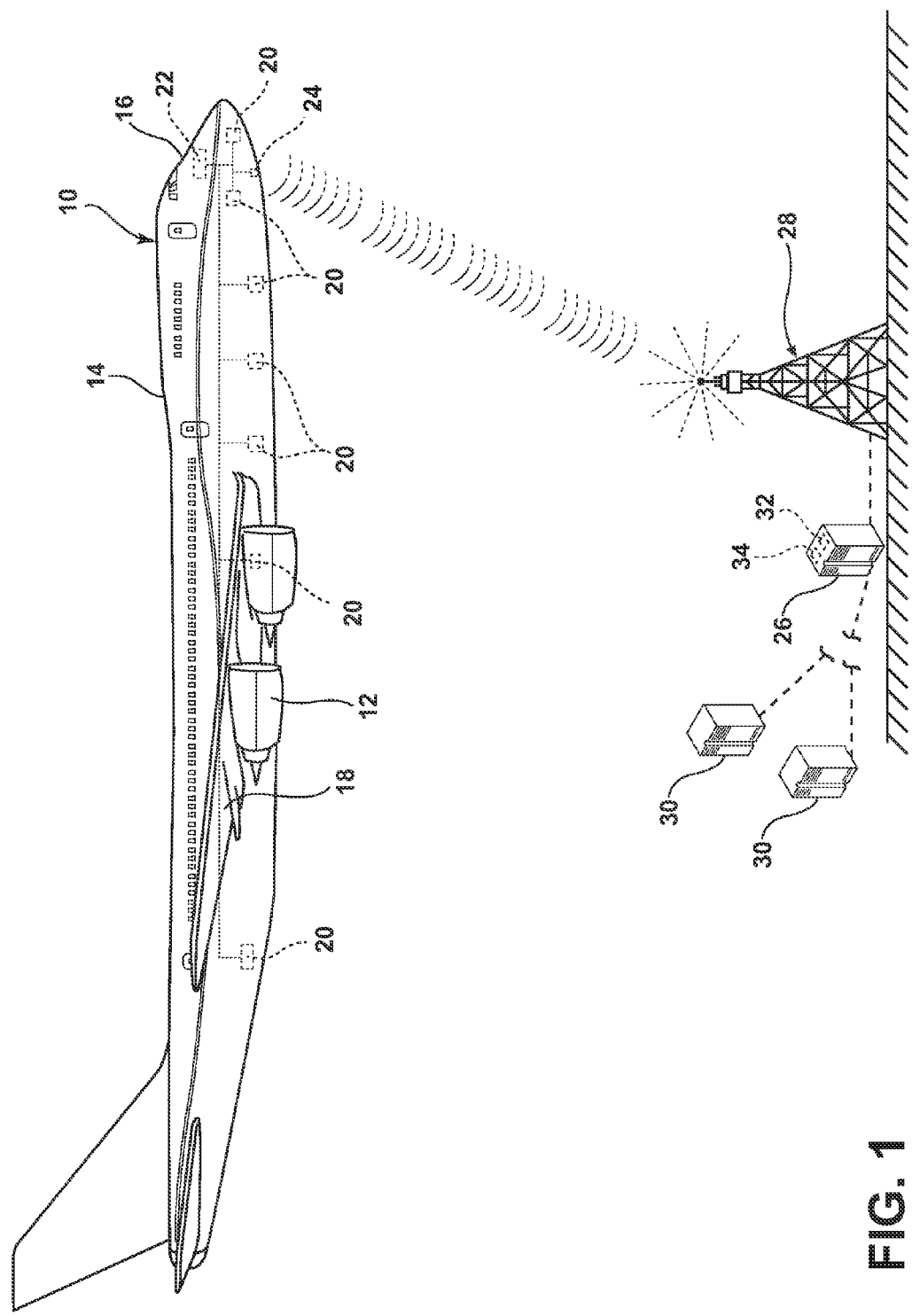
FIG. 1 is a schematic illustration of an aircraft and systems providing information to a ground system.

FIG. 1 depicts an aircraft 10 that may provide a variety of flight data related to a flight of the aircraft 10. One or more propulsion engines 12 coupled to a fuselage 14, a cockpit 16 positioned in the fuselage 14, and wing assemblies 18 extending outward from the fuselage 14 may be included in the aircraft 10. Further, a plurality of aircraft systems 20 that enable proper operation of the aircraft 10 may be included as well as a controller or computer 22, and a communication system having a communication link 24. While a commercial aircraft has been illustrated, it is contemplated that embodiments of the invention may be used in any type of aircraft, for example, without limitation, fixed-wing, rotating-wing, rocket, personal aircraft, and military aircraft.

The plurality of aircraft systems 20 may reside within the cockpit 16, within the electronics and equipment bay (not shown), or in other locations throughout the aircraft 10 including that they may be associated with the engines 12. Such aircraft systems 20 may include but are not limited to an electrical system, an oxygen system, hydraulics and/or pneumatics system, a fuel system, a propulsion system, navigation systems, flight controls, audio/video systems, an Integrated Vehicle Health Management (IVHM) system, and systems associated with the mechanical structure of the aircraft 10. The computer 22 may, among other things, automate the tasks of piloting and tracking the flight plan of the aircraft 10. The computer 22 may include or be associated with any suitable number of individual microprocessors, power supplies, storage devices, interface cards, auto flight systems, flight management computers, and other standard components. The computer 22 may include or cooperate with any number of software programs (e.g., flight management programs) or instructions designed to carry out the various methods, process tasks, calculations, and control/display functions necessary for operation of the aircraft 10. The computer 22 is illustrated as being in communication with the plurality of aircraft systems 20 and it is contemplated that the computer 22 may aid in operating the aircraft systems 20 and may receive information from the aircraft systems 20.

The communication link 24 may be communicably coupled to the computer 22 or other processors of the aircraft to transfer flight data information off the aircraft 10. It is contemplated that the communication link 24 may be a wireless communication link and may be any variety of communication mechanism capable of wirelessly linking with other systems and devices and may include, but is not limited to, packet radio, satellite uplink, Wireless Fidelity (WiFi), WiMax, Bluetooth, ZigBee, 3G wireless signal, code division multiple access (CDMA) wireless signal, global system for mobile communication (GSM), 4G wireless signal, long term evolution (LTE) signal, Ethernet, or any combinations thereof. It will also be understood that the particular type or mode of wireless communication is not critical to this invention, and later-developed wireless networks are certainly contemplated as within the scope of this invention. Further, the communication link 24 may be communicably coupled with the computer 22 through a wired link without changing the scope of this invention. Further still, the communication link 24 may be a wired communication link that may be physically coupled with a component or system to transfer information thereto. Although only one communication link 24 has been illustrated, it is contemplated that the aircraft 10 may have multiple communication links communicably coupled with the computer 22. Such multiple communication links may provide the aircraft 10 with the ability to transfer flight data information off the aircraft 10 in a variety of ways.

As illustrated, the computer 22 may communicate with a computer 26, which may be located at and include a designated ground station 28 via the communication link 24. The ground station 28 may be any type of communicating ground station 28 such as air traffic control. In general, any type of information can be communicated via the communication link 24, including communicating PFD from the aircraft 10 to the ground station 28.

During operation of the aircraft 10, the computer 22 may receive information from the aircraft systems 20. The computer 22 may execute a program for transmitting PFD from the aircraft 10 to the ground station 28. It is contemplated that such a process may be user initiated or may be implemented automatically by the computer 22 when the aircraft 10 is in flight or lands.

Additionally, OFD from one or more servers, systems, or computers 30, may be relayed through another communication link, which may or may not be wireless, to the computer 26. The computers 30 may be located at the same ground station 28 or alternative locations including an airline operations center, flight plan provider, external database centers, etc. The OFD may be obtained from third parties including airports, training centers, etc. The OFD may relate to a number of flights including the flight related to the PFD received. In this manner, the computer 26 may receive PFD and OFD related to a flight of the aircraft 10 and may store such information.

The computer 26 may include a computer-searchable database 32 and a matching module 34. Alternatively, the computer 26 may form the matching module 34. Further still, a variety of computers or processors may form the matching module. It will be understood that the computer 26 is merely one exemplary system for implementing the overall or portions of the exemplary embodiments. The computer 26 might include a general-purpose computing device in the form of a computer, including a processing unit, a system memory, and a system bus, that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD-ROM or other optical media. The drives and their associated machine-readable media provide nonvolatile storage of machine-executable instructions, data structures, program modules, and other data for the computer.

It will be understood that the computer-searchable database 32 may be any suitable database, including a single database having multiple sets of data, multiple discrete databases linked together, or even simple tables of data. Regardless of the type of database, the computer-searchable database 32 may be provided on storage medium or may be provided on a computer readable medium, such as a database server. It is contemplated that the computer-searchable database 32 may include both PFD and OFD sets. Such data may be received by the computer-searchable database 32 in any suitable manner. It is also contemplated that the computer-searchable database 32 may include additional information or additional data, such as data to aid in matching the PFD set to one of the OFD sets. It is further contemplated that such additional data may include error characteristics for the data features as discussed below.

The matching module 34 may be executed on the computer 26 configured to access or query the computer-searchable database 32 and match PFD to OFD. Alternatively, the computer searchable database 32 may be separate from the matching module 34 and that in such instances, the matching module 34 may access the computer-searchable database 32 via a communication network or computer network coupling the matching module 34 to the computer-searchable database 32. By way of non-limiting example, such a computer network may be a local area network or a larger network such as the internet. It is contemplated that the matching module 34 may make repeated queries of the computer-searchable database 32. The matching module 34 may be configured, for each PFD set, to determine a matching OFD. In implementation, such a selection process may be converted to an algorithm to match the PFD and OFD sets. Such an algorithm may be converted to a computer program comprising a set of executable instructions, which may be executed by the matching module 34. Additional inputs to the computer program may include inputs from the computer-searchable database 32. The computer program may have an executable instruction set for receiving or querying data from the computer-searchable database 32, selecting from the OFD sets a set that matches the PFD, and linking the sets based thereon.

During operation, the matching module 34 may communicate with the computer-searchable database 32 and may receive data from the computer-searchable database 32 including a PFD set and multiple OFD sets. It will be understood that multiple PFD sets may be obtained from the computer-searchable database 32. While a first-pass of an algorithm may operate on a single PFD set at once a second-pass may operate on multiple PFD sets at once as described in more detail below.

The matching module 34 may match the PFD set to one of the OFD sets and may link the sets based thereon. The matching module 34 may also determine an error estimation for potential matches. For example, an algorithm may be used for determining the error estimation. Such an algorithm may be converted to a computer program comprising a set of executable instructions, which may be executed by the matching module 34. Further, the matching module 34 may match a PFD set to an OFD set by comparing features of the two. More specifically, the matching module 34 may use an algorithm to determine a total score that considers the error estimates of the features.

It will be understood that details of environments that may implement embodiments of the invention are set forth in order to provide a thorough understanding of the technology described herein. It will be evident to one skilled in the art, however, that the exemplary embodiments may be practiced without these specific details. The exemplary embodiments are described with reference to the drawings. These drawings illustrate certain details of specific embodiments that implement a module or method, or computer program product described herein. However, the drawings should not be construed as imposing any limitations that may be present in the drawings. The method and computer program product may be provided on any machine-readable media for accomplishing their operations. The embodiments may be implemented using an existing computer processor, or by a special purpose computer processor incorporated for this or another purpose, or by a hardwired system.

As noted above, embodiments described herein may include a computer program product comprising machine-readable media for carrying or having machine-executable instructions or data structures stored thereon. Such machine-readable media may be any available media, which may be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium that can be used to carry or store desired program code in the form of machine-executable instructions or data structures and that can be accessed by a general purpose or special purpose computer or other machine with a processor. When information is transferred or provided over a network or another communication connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data, which cause a general-purpose computer, special purpose computer, or special purpose processing machines to perform a certain function or group of functions.

Embodiments will be described in the general context of method steps that may be implemented in one embodiment by a program product including machine-executable instructions, such as program codes, for example, in the form of program modules executed by machines in networked environments. Generally, program modules include routines, programs, objects, components, data structures, etc. that have the technical effect of performing particular tasks or implement particular abstract data types. Machine-executable instructions, associated data structures, and program modules represent examples of program codes for executing steps of the method disclosed herein. The particular sequence of such executable instructions or associated data structures represent examples of corresponding acts for implementing the functions described in such steps.

Embodiments may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the internet and may use a wide variety of different communication protocols. Those skilled in the art will appreciate that such network computing environments will typically encompass many types of computer system configurations, including personal computers, hand-held devices, multiprocessor systems, microprocessor-based or programmable consumer electronics, network PCs, minicomputers, mainframe computers, and the like.

Embodiments may also be practiced in distributed computing environments where tasks are performed by local and remote processing devices that are linked (either by hardwired links, wireless links, or by a combination of hardwired or wireless links) through a communication network. In a distributed computing environment, program modules may be located in both local and remote memory storage devices.

Figure 2:
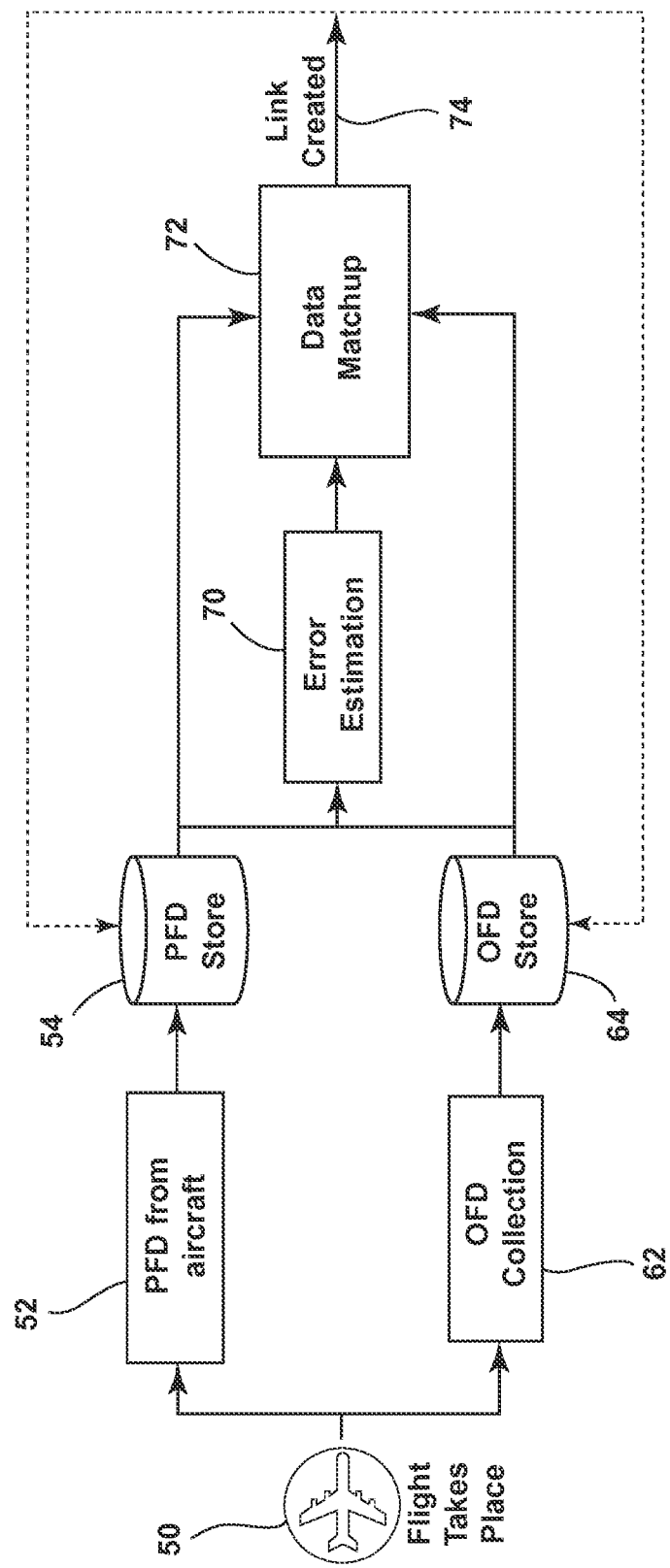
FIG. 2 is a schematic illustration of a matching framework according to an embodiment of the invention.

FIG. 2 illustrates a pictorial explanation of an embodiment of the invention. More specifically, FIG. 2 illustrates that a flight takes place at 50. PFD may be communicated from the aircraft at 52 and may be stored at 54. It will be understood that such PFD may be any amount of data from any suitable system or asset on the aircraft 10 for which information may be collected and monitored for any given reason including for monitoring the health of the aircraft 10. By way of non-limiting example, the PFD may include any recorded flight data. Preferred flight data that may be received may include Aircraft Id, Flight Number, Takeoff Airport, Landing Airport, Pushback Time, Liftoff Date, Liftoff Time, Touchdown Date, Touchdown Time, Sequence of airports before Takeoff Airport, and Sequence of airports after Landing Airport. It is contemplated that feature extraction may be used to process the initial PFD data received at 52. This may be done in any suitable manner including by a general-purpose computer, such as the computer 26, running feature extraction algorithms. For example, the PFD may be processed in some way to derive data features from the raw PFD. In this manner, the PFD may be processed in such a way that it provides useful information, which may be compared to OFD to find a matching data set.

At 62 OFD sets may be received or collected from a variety of sources such as the computers 30 and such information may be stored at 64. Examples of OFD data sets may include flight schedules also known as OOOI or out/off/on/in times, flight plans including detailed planning information for an individual flight that may include flight path, waypoints, alternate airports, cruise speeds, crew info, fuel loads, weather, advisories, etc., fuel data including load, usage, etc., weight and balance information, passenger and baggage report data, crew information, taxi data, ACARS (Aircraft Communications Addressing and Reporting System) information, Aircraft APU (auxiliary power unit) data, etc. Such OFD data may be collected from any number of sources including third parties.

At 72, the matching module 34 may compare the data in the PFD data store 54 and the OFD data store 64 and may make an accurate data matchup at 72. More specifically, the PFD contains records that refer to a flight and the OFD contains records that refer to that flight and a number of other flights. For every record in the PFD data set the matching module 34 may find a record in a potential OFD match such that both records refer to the same exact flight. The matching module 34 allows for accurate matching of records that refer to the same flight by comparing a set of features common to both. For example, as illustrated, error estimation information 70 may be utilized in determining the accurate data matchup at 72. Once a PFD set is matched to an OFD set a link may be created between the two and stored in memory.

Figure 3:
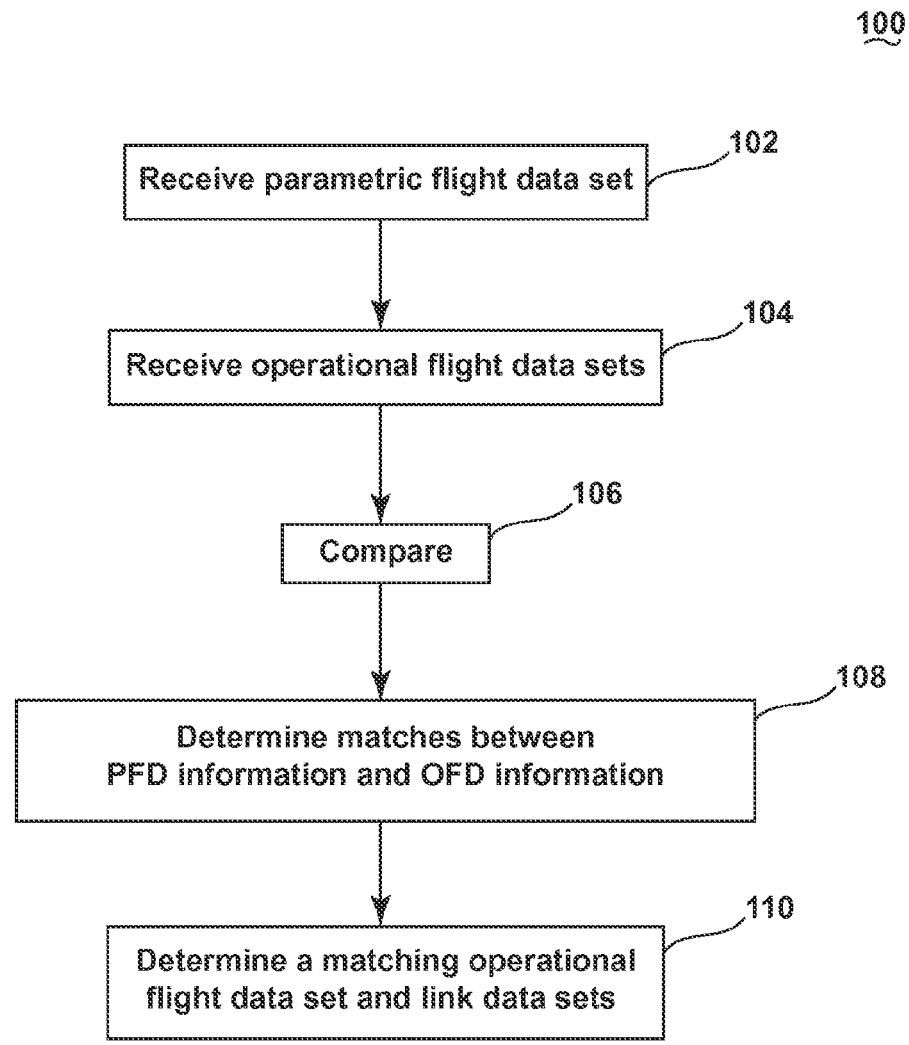
FIG. 3 is a flowchart showing a method of matching data according to an embodiment of the invention.

In accordance with an embodiment of the invention, FIG. 3 illustrates a method 100, which may be used for matching flight data from multiple sources. The method 100 begins at 102 by the matching module 34 receiving a PFD set for a given flight where the PFD set includes a number of data features. As described above the matching module 34 may be, among other things, a general-purpose computing device or may be a program located on a general-purpose computing device. The PFD set may take any suitable form including that the received data may include at least one data table. It will be understood that the PFD set may include raw data from the aircraft and/or extracted information from the recorded flight data.

At 104, the matching module 34 may receive a number of OFD sets from any number of suitable sources. The OFD sets may be related to a number of flights and may include a number of data features. Both the PFD set received at 102 and the OFD sets received at 104 may have values corresponding to a data feature. While not illustrated it is contemplated that one or more of the data sets may be normalized, as described in more detail below.

At 106, one or more of the data features of the PFD set may be compared to data features of the OFD sets. By way of non-limiting example, the data sets may have a plurality of common data features including Aircraft Id, Flight Number, Takeoff Airport, Landing Airport, Pushback Time, Liftoff Date, Liftoff Time, Touchdown Date, Touchdown Time, Sequence of airports before Takeoff Airport, and Sequence of airports after Landing Airport. The common features are what are compared between each PFD and OFD flight pairing examined. For example, the values for one or more of the data features may be compared. It is contemplated that any number of data features may be compared at 106. It will be understood that there are cases when each feature cannot be compared, since it may be missing from either the PFD set or OFD sets. The comparison may determine if features in the data sets agree, disagree, or could not be determined. It may be determined that the features could not be determined when data is missing from one of the data sets.

At 108, matches may be determined between data features in the PFD set with data features in the OFD sets based on the comparison. Based on such matches, a matching OFD set for the PFD set may be determined at 110 and the data sets may be linked based thereon. Such a match may be achieved in various ways using various algorithms or computer programs. For example, the matching module 34 may determine a most likely match based on the information matched at 108.

It will be understood that the method 100 is flexible and the method 100 is illustrated merely for illustrative purposes. For example, the sequence of steps depicted is for illustrative purposes only, and is not meant to limit the method 100 in any way, as it is understood that the steps may proceed in a different logical order or additional or intervening steps may be included without detracting from embodiments of the invention. By way of non-limiting example, the receiving of the data at 102 and 104 may occur in any order and the data may be received simultaneously.

Figure 4:
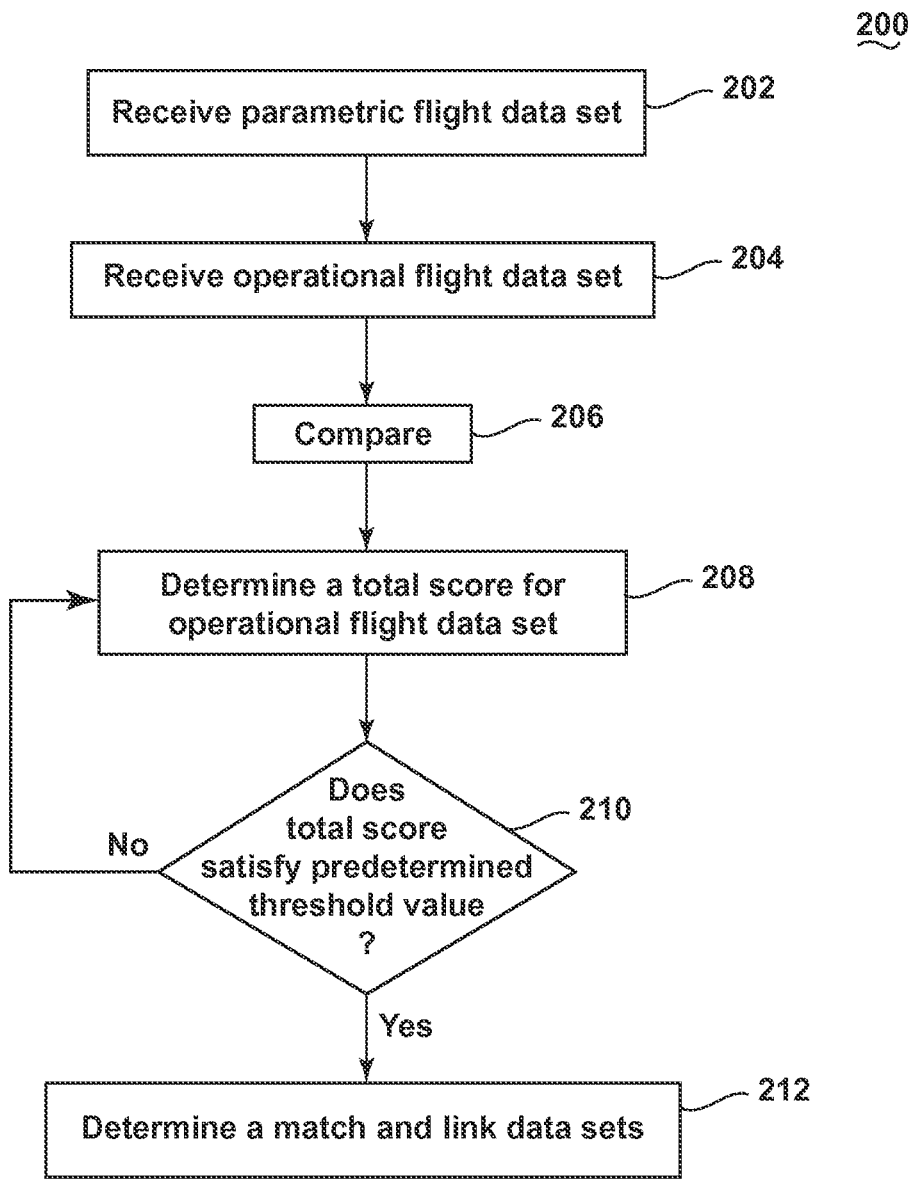
FIG. 4 is a flowchart showing another method of matching data according to an embodiment of the invention.

Further, a method for matching flight data from multiple sources may also include determining a total score for a potentially matching OFD set. FIG. 4 illustrates an alternative method 200, which is similar to the method 100. It will be understood that the description of the like portions of the method applies to the method 200, unless otherwise noted.

One difference is that at 208, a total score for each potentially matching OFD set may be determined. It is contemplated that the PFD set may be compared to every OFD set and assigned a score, which encapsulates how close their features agree and how reliable these comparisons are given the error characteristics of the two data sets. These resulting scores are then used in conjunction with one or more threshold values at 210 to determine which OFD set is a match and which OFD sets are not. In practice, it is not necessary to compare each PFD set to every OFD set, but each PFD set is compared against a large number of candidates. By way of non-limiting example, each PFD set may be compared to fifty thousand or more OFD sets. Once the OFD set is determined to satisfy the predetermined threshold a match between the PFD and OFD may be determined and link may be created between the data sets at 212. The term "satisfies" the threshold is used herein to mean that the variation comparison satisfies the predetermined threshold, such as being equal to, less than, or greater than the threshold value. It will be understood that such a determination may easily be altered to be satisfied by a positive/negative comparison or a true/false comparison. For example, a less than threshold value can easily be satisfied by applying a greater than test when the data is numerically inverted.

The total scores determined at 208 may heavily depend on the error characteristics of the data sets. If the data had no errors at all, then the common features in both data sets would always agree exactly for a match. If the error rate of a feature is high, then not as much weight should be given to agreements or disagreements in that feature versus those in another feature for which the error rate is much lower. It is contemplated that the error rate for each feature can vary on a per-fleet and per-aircraft level.

Some sources of errors may be corrected in a pre-processing data normalization phase. Normalization may make sure that the common features to be compared are actually comparable in the first place. For example, the normalization phase may make sure that one data set does not have local times while the other has UTC times. Once the data is in a normalized state and error characteristics for the features have been numerically identified then the PFD set may be compared to the OFD sets.

Figure 5:
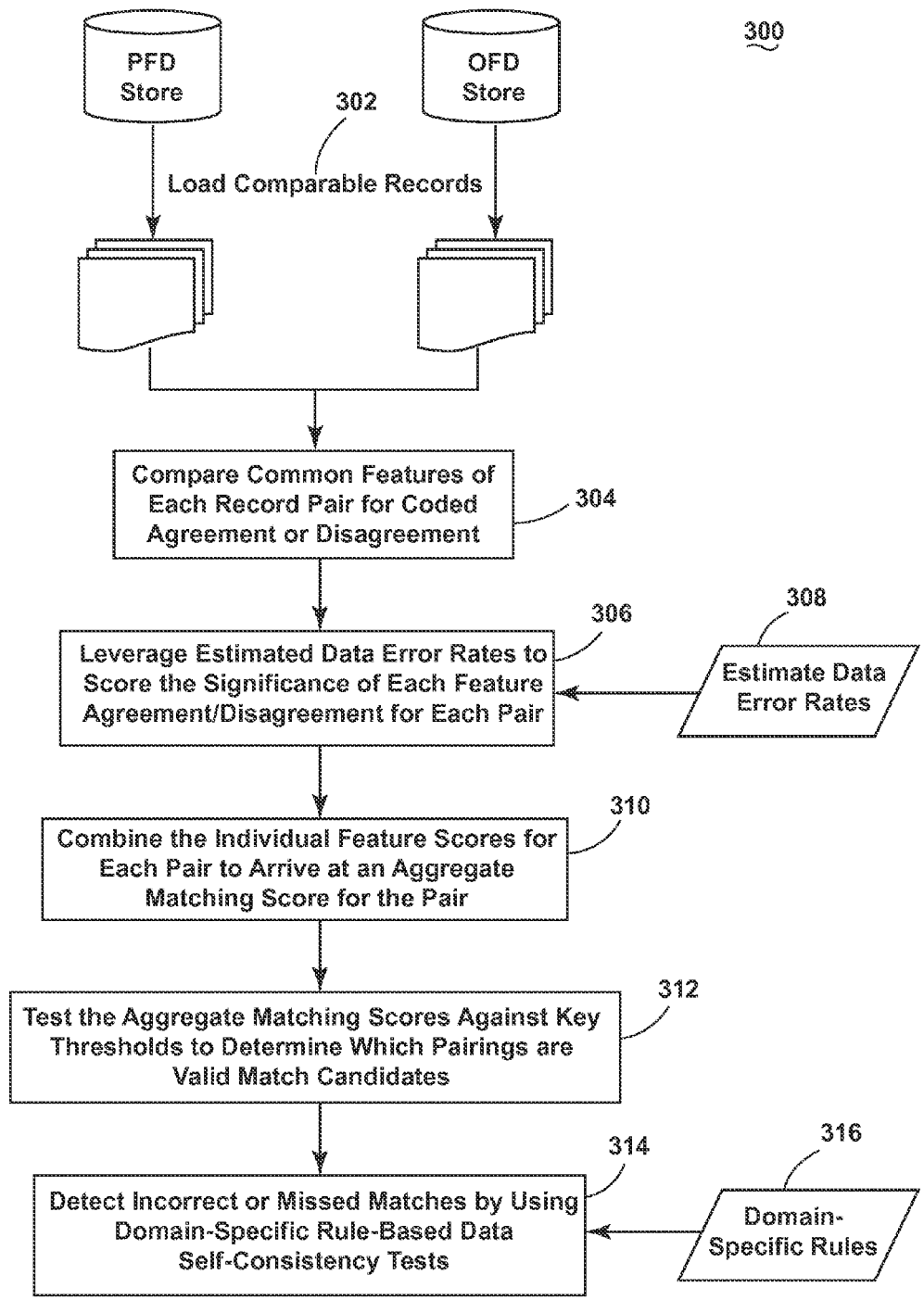
FIG. 5 is a flowchart showing yet another method of matching data according to an embodiment of the invention.

FIG. 5 illustrates an alternative method 300, which is similar to the method 200. It will be understood that the description of the like portions of the method applies to the method 300, unless otherwise noted. One difference is that the PFD and OFD sets are both loaded to the matching module at 302. Common features of each record are compared at 304. By way of non-limiting example, for each PFD-OFD pairing considered, each of the common features may be tested. The result of each test may be one of three states (i.e. Agreement, Disagreement, or Could Not Run), where the last represents the fact that the test could not be run because of missing data and thus gives no information as to whether the pairing is a match or not. The score for a test is assigned a zero when it cannot be run. At 306, the matching module may use error rates, such as those provided at 308, to score the significance of each feature agreement or disagreement. For example, for the following sets:

M=set of (PFD,OFD) pairs that are matches
U=set of (PFD,OFD) pairs that are not matches A score for each test is calculated using four probabilities:

$\mathcal{P}$ (agree|M)
=probability that test will result in agreement given that the pair is in M.

$\mathcal{P}$ (disagree|M)
=probability that test will result in disagreement given that the pair is in M.

$\mathcal{P}$ (agree|U)
=probability that test will result in agreement given that the pair is in U.

$\mathcal{P}$ (disagree|U)
=probability that test will result in disagreement given that the pair is in U.

However, there are actually only two independent probabilities because:

$$1 = \mathcal{P}(\text{agree}|M) + \mathcal{P}(\text{disagree}|M)$$

and $$1 = \mathcal{P}(\text{agree}|U) + \mathcal{P}(\text{disagree}|U)$$

The individual score assigned for each test is:

$S(\text{agree}) = \log_{10}\mathcal{P}(\text{agree}|M) - \log_{10}\mathcal{P}(\text{agree}|U)$  Agreement Score:

$S(\text{disagree}) = \log_{10}\mathcal{P}(\text{disagree}|M) - \log_{10}\mathcal{P}(\text{disagree}|U)$  Disagreement Score:

In practice, agreement scores are positive and disagreement scores are negative, reflecting that agreements between a pair increase the confidence of a match and disagreements increase the confidence of a non-match. The individual feature scores for each pair may be combined at 310 to determine a total score. The total score assigned to a PFD-OFD pairing is the sum of all the scores of the individual tests. Table 1 below is an example scoring from a pairing, which later turns out to be a match (all features agreed):

TABLE 1

| Feature | PFD Data | Candidate OFD Data | Candidate Result | Candidate Scoring |
|---|---|---|---|---|
| Flight Number Agreed | BLA1234 | BLA1234 | Agreement | 2.8075 |

TABLE 1-continued

| Feature | PFD Data | Candidate OFD Data | Candidate Result | Candidate Scoring |
|---|---|---|---|---|
| Aircraft ID Agreed | WX-QRT | WX-QRT | Agreement | 1.9664 |
| Origin Agreed | LAX | LAX | Agreement | 0.8785 |
| Destination Agreed | SJC | SJC | Agreement | 0.8786 |
| Pushback Time Agreed | 12:51:37 UTC | 12:48:00 UTC | Agreement | 1.3789 |
| Liftoff Date Agreed | 3-Feb-99 | 3-Feb-99 | Agreement | 1.9634 |
| Liftoff Time Agreed | 12:57:35 UTC | 12:57:00 UTC | Agreement | 1.9018 |
| Touchdown Date Agreed | Feb. 3, 1999 | Feb. 3, 1999 | Agreement | 1.9638 |
| Touchdown Time Agreed | 14:06:02 UTC | 14:06:00 UTC | Agreement | 1.9018 |
| Before Sequence Agreed | AP1-AP2-AP3 | AP1-AP2-AP3 | Agreement | 3.2325 |
| After Sequence Agreed | AP1-AP2-AP3 | AP1-AP2-AP3 | Agreement | 3.2325 |
| Total Score | | | | 22.1057 |

The table 1 example illustrates how the meaning of "Agreement" varies based on the feature. For Origin/Destination, it means those airports matched. For times, it means that the times were within a limited range of each other. For Flight Number, logic that is more sophisticated can ignore common data entry errors and differences in reporting between the PFD and OFD sets. The general design allows for custom comparison logic for each feature. It should be noted also that even though all features agreed, the score of some features varied. This is because the $\mathcal{P}$ (agree|M) and $\mathcal{P}$ (agree|U) values differed. By way of non-limiting example, flight number was a stronger test than origin in this case.

Table 2 below is an example scoring from a pairing, which turns out to not be a match:

TABLE 2

| Feature | PFD Data | Candidate OFD Data | Candidate Result | Candidate Scoring |
|---|---|---|---|---|
| Flight Number Agreed | BLA1234 | OO1234 | Agreement | 2.8075 |
| Aircraft ID Agreed | WX-QRT | WX-QRT | Agreement | 1.9664 |
| Origin Agreed | LAX | LAX | Agreement | 0.8785 |
| Destination Agreed | SJC | SJC | Agreement | 0.8786 |
| Pushback Time Agreed | 12:51:37 UTC | 12:49:00 UTC | Agreement | 1.3789 |
| Liftoff Date Agreed | 3-Feb-99 | 19-Feb-99 | Disagreement | −2.577 |
| Liftoff Time Agreed | 12:57:35 UTC | 12:57:00 UTC | Agreement | 1.9018 |
| Touchdown Date Agreed | Feb. 3, 1999 | Feb. 19, 1999 | Disagreement | −2.577 |
| Touchdown Time Agreed | 14:06:02 UTC | 14:08:00 UTC | Agreement | 1.9018 |
| Before Sequence Agreed | AP1-AP2-AP3 | AP1-AP2-AP3 | Agreement | 3.2325 |
| After Sequence Agreed | AP1-AP2-AP3 | | Could Not Run | 0 |
| Total Score | | | | 9.792 |

The Table 2 example shows a common situation where an aircraft flies the same route at the same times, but on different dates. The dates were the main source of disagreement that caused the score to be significantly lower than the previous candidate. In addition, it was not possible to calculate an after sequence for the OFD candidate in this case, so that test could not be run and did not contribute for or against the score.

In this manner, the scores from the individual tests are used to generate a total score for a given candidate OFD flight at 310. For each PFD flight a set of candidate OFD flights is scored, producing a score for each. Such scores may be tested at 312 to determine which pairings are valid match candidates. This may include that the total scores are compared to one or more thresholds to determine if they satisfy the one or more thresholds. Any suitable thresholds may be used.

By way of non-limiting example, the two highest scores may be tracked and then two thresholds may be considered: 1) the minimum score to consider a comparison a valid match and 2) the minimum difference between the top two scores to consider the top score a valid match. It will be understood that some scores near the thresholds can lead to false-positive or false-negative matches. By way of non-limiting example, and utilizing the examples in the tables above, Table 3 below shows a comparison of the two scores. The total scores may result in a valid match using a minimum score threshold of 5.2 and a minimum difference threshold of 3.0.

TABLE 3

| | |
|---|---|
| Best Candidate Score | 22.10568 |
| Second Best Candidate Score | 9.792038 |
| Difference Between Two Best Scores | 12.31364 |

Further, at 314 incorrect or missed matches may be determined utilizing domain-specific rules at 316. More specifically, some of the scores near the thresholds represent false-negatives, where some matches are not marked as a match even though they are indeed a true match. The domain-specific information may be used at 314 to catch these missed matches. Likewise, some of the scores near the thresholds represent false-positives. The domain-specific information may be used at 314 to unmatch these. It is contemplated that such determinations or second pass matching is possible because PFD generally comes in a chunk with multiple sequenced flights. It is therefore possible to look at the context of surrounding flights for extra information to help with matching. Thus, when multiple parametric flight data sets are received they may be utilized to confirm the match before linking occurs and the domain-specific information may be utilized to catch a missed match and un-match false-matches before linking occurs.

An example of matching false negatives is illustrated with respect to table 4, below, which did not result in a valid match in the first pass of the algorithm because the minimum score threshold of 5.2 was barely missed:

TABLE 4

| | |
|---|---|
| Best Candidate Score | 5.13395 |
| Second Best Candidate Score | 0.04878712 |
| Difference Between Two Best Scores | 5.085163 |
| Matched In Second Pass | Yes |
| Candidate Set Size | 59468 |

However, the nearby flights in the Download did match with high scores as shown in table 5, below, where the unmatched PFD record is underlined below.

TABLE 5

| PFD records | Matched OFD Records | Matching Score |
|---|---|---|
| 123456 | 1282478 | 14.0 |
| 123457 | 1282481 | 15.0 |
| 123458 | 1282337 | 13.9 |
| 123459 | 1282343 | 12.0 |
| <u>123460</u> | | |
| 123461 | 1283144 | 13.9 |
| 123462 | 1283153 | 13.5 |
| 123463 | 1282659 | 16.0 |

The determination at 314 may rerun the matchup with a restricted set of OFD flights rather than the full set. The determination may only compare the PFD to OFD flights localized in time around the confidently matched flights. The matching scores will not change but there will be a much smaller set of candidates to distinguish between. In the determination at 314, the minimum score threshold may be reduced because the localization information provides extra confidence that the right match is being found.

Often matching scores are high enough, but there are missed matches because the minimum difference threshold was not met. Culling the set of candidates is one way to determine the correct match. The difference between the top two scores generally grows after running with the smaller set of OFD flights, because the OFD flight that had the second highest score is no longer in the set.

It is contemplated that before the determination at 314 may begin that quality matches must be determined initially. For example, a certain percentage of the download may be required to have matched to be able to make the determination at 314. The term "download" as used herein refers to a chunk of PFD data, which may usually include multiple flights from the same aircraft. The process may also make sure some other data quality check pass including that all downloads have come from the same aircraft, so all matched OFD flights should have the same aircraft.

An example of avoiding false positives may include that after an OFD set is matched to a PFD set, it is checked whether the OFD set has ever been previously matched in the system to a different PFD flight. If so, the match may be flagged and a manual review may be required because one of the two matches must be incorrect.

An ordering check may also be utilized where the matched OFD candidates are cycled through to check to make sure they are sequential in time. If not, they are suspect so they are not matched.

It will be understood that the methods described above are flexible. For example, it is contemplated that an iterative method may be used for obtaining probabilities or error rates from the data. Initial values may be selected and these initial values may be modified in an iterative fashion until they are sufficiently settled, based on runs of the matchup against a sizable data set. By way of non-limiting example, an initial estimate for the $\mathcal{P}$ (disagree|M) error for the field 'Aircraft ID' might be 0.01, meaning it differs 1 out of 100 times even for true matches ($\log_{10}\mathcal{P}$ (disagree|M)=−2). An algorithm may be run using the initial estimates and matches may be selected based thereon. The error rate may then be recalculated based on an examination of how often the 'Aircraft ID' field really differed among assigned matches. For example, such an evaluation might end up yielding a value of 0.03, meaning the 'Aircraft ID' is a less reliable indicator than initially believed, and during future runs of the algorithm the feature may be weighted less than another one with a lower error rate. The iteration may be continued, rerunning the algorithm using the new error rates and recalculating them based on the latest sets of matches.

A similar process may be used for $\mathcal{P}$ (agree|U) error rates. Except that instead of looking at those PFD-OFD pairs that were classified as matches in the first run of the algorithm, the iterative method looks at the ones which were considered non-matches. It may be calculated from the data how often it happens that the given feature agrees when the records are not actually a match. In this case, agreements can happen even if there are no errors in the data. The calculation reflects both that and errors in the data. Since the first run of the algorithm is using some initial values, there may be some pairs classified as matches, which really are not, and some as non-matches, which really are. Despite this, on the whole, most of the initial pair classifications are correct. The iterative process makes the estimates of error rates converge toward their true values, resulting in the most appropriate weighting of the fields. Each successive iteration captures more true matches and less false matches.

Technical effects of the above-described embodiments include that data sets from a variety of sources may be matched in an accurate manner allowing the information to be linked or otherwise combined. Accurate matching may be accomplished even if incomplete or erroneous identification information exists in the data. The ability to accurately link data sources in the face of incomplete or erroneous data provides the ability to perform analysis on commercially valuable problems including the improvement of planning systems by combining planned information with actual information. Once the data is matched and OFD data is connected to PFD data, many additional benefits can be realized in analyzing such data. For example, planned data may be combined with actual data and improvements in planning may be made based thereon.

To the extent not already described, the different features and structures of the various embodiments may be used in combination with each other as desired. That one feature may not be illustrated in all of the embodiments is not meant to be construed that it may not be, but is done for brevity of description. Thus, the various features of the different embodiments may be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of matching flight data from multiple sources, comprising:
   recording, via an aircraft communication link, a parametric flight data set for a flight;
   obtaining a set of operational flight data sets related to a number of flights;
   comparing a set of data features of the parametric flight data set to a set of data features of a subset of the operational flight data sets;
   determining a total score for each operational flight data set included in the subset based on the comparison of the set of data features;
   determining a difference between a first highest total score and a second highest total score satisfies a minimum difference threshold value;
   determining that the first highest total score satisfies a predetermined total score threshold value;
   in response to determining that the determined difference satisfies the minimum difference threshold value and the first highest total score satisfies the predetermined total score threshold value, linking the at least one parametric flight data set and the operational flight data set having the first highest total score; and
   adjusting a planned data set based at least in part on the linked parametric flight data set and the operational flight data set.

2. The method of claim 1, further comprising normalizing the data sets prior to the comparing.

3. The method of claim 1 wherein the data sets have a plurality of common data features including aircraft id, flight number, takeoff airport, landing airport, pushback time, liftoff date, liftoff time, touchdown date, touchdown time, sequence of airports before takeoff airport, and sequence of airports after landing airport.

4. The method of claim 3 wherein the parametric flight data set and the operational flight data sets have values corresponding to a data feature and the comparing compares the values for the data feature.

5. The method of claim 1 wherein the comparing determines at least one of if features in the data sets agree, disagree, or could not be determined.

6. The method of claim 5 wherein it is determined that the features could not be determined when data is missing from one of the data sets.

7. The method of claim 1 wherein the transmission is a wireless transmission.

8. The method of claim 1 wherein the operational data sets are received from a third party that includes an airport or a training center.

9. The method of claim 1 wherein the recorded parametric flight data includes data from a system or an asset of the aircraft.

10. A method of matching flight data from multiple sources, comprising:
    record, from an aircraft transmission over an aircraft communication link, a parametric flight data set for a given flight;
    receive, by a matching module, at least one parametric flight data set for the given flight, wherein the at least one parametric flight data set includes a number of data features;
    receive, by the matching module, operational flight data sets related to a number of flights, wherein the operational flight data sets include a number of data features;
    compare, by the matching module, a set of data features of the at least one parametric flight data set to a set of data features of a set of candidate operational flight data sets included in the operational flight data sets;
    determine a total score for each candidate operational flight data set based on the comparison of the sets of data features;
    determine if a difference between a first top total score and a second top total score for the set of candidate operational flight data sets satisfies a minimum difference threshold value;
    determine if the total score for the first top score satisfies at least one predetermined threshold value; and
    determine a match between the at least one parametric flight data set and operational flight data set having the first top total score when the first top total score satisfies the at least one predetermined threshold value and the determined difference satisfies the minimum difference threshold value; and
    updating, based at least in part on the matched at least one parametric flight data set and operational flight data set, at least one planning system.

11. The method of claim 10 wherein determining a total score comprises determining an error characteristic for the data features and scoring each comparison based on error characteristics.

12. The method of claim 10 wherein the at least one parametric flight data set and the operational flight data sets have values corresponding to each data feature and the comparing compares the values for each data feature.

13. The method of claim 10 wherein multiple parametric flight data sets are received and utilized to confirm the match before linking occurs.

14. The method of claim 13, further comprising utilizing domain-specific information to catch missed matches and un-match false-matches before linking occurs.

15. The method of claim 10 wherein the transmission is a wireless transmission.

16. The method of claim 10 wherein the operational data sets are received from a third party that includes an airport or a training center.

* * * * *